(12) United States Patent
Eller et al.

(10) Patent No.: US 8,665,710 B2
(45) Date of Patent: Mar. 4, 2014

(54) PROTOCOL CIRCUIT LAYER

(75) Inventors: Riley Eller, Seattle, WA (US); Frank Laub, Seattle, WA (US); Jeremy Bruestle, Seattle, WA (US); Mark L Tucker, Seattle, WA (US)

(73) Assignee: CoCo Communications Corp., Seattle, WA (US)

( * ) Notice: Subject to any disclaimer, the term of this patent is extended or adjusted under 35 U.S.C. 154(b) by 19 days.

(21) Appl. No.: 13/532,614

(22) Filed: Jun. 25, 2012

(65) Prior Publication Data

US 2012/0320740 A1 Dec. 20, 2012

Related U.S. Application Data

(63) Continuation of application No. 12/278,144, filed as application No. PCT/US2007/061488 on Feb. 1, 2007, now Pat. No. 8,208,466.

(60) Provisional application No. 60/763,977, filed on Feb. 1, 2006.

(51) Int. Cl.
*H04L 12/26* (2006.01)

(52) U.S. Cl.
USPC ........... 370/225; 370/389; 370/392; 370/400; 707/716; 709/230; 713/151; 726/3

(58) Field of Classification Search
USPC ........ 370/225, 389, 392, 400; 713/151; 726/3
See application file for complete search history.

(56) References Cited

U.S. PATENT DOCUMENTS

| | | | | |
|---|---|---|---|---|
| 8,228,786 B2* | 7/2012 | Vasseur et al. | ................ | 370/219 |
| 8,270,413 B2* | 9/2012 | Weill et al. | ................ | 370/395.53 |
| 2003/0210686 A1* | 11/2003 | Terrell et al. | ................ | 370/389 |
| 2004/0210663 A1* | 10/2004 | Phillips et al. | ................ | 709/230 |
| 2005/0185588 A1 | 8/2005 | Park et al. | | |
| 2008/0320305 A1 | 12/2008 | Bruestle et al. | | |
| 2009/0067322 A1* | 3/2009 | Shand et al. | ................ | 370/225 |
| 2012/0254153 A1* | 10/2012 | Abraham et al. | ............. | 707/716 |

FOREIGN PATENT DOCUMENTS

JP 2004056340 2/2004

OTHER PUBLICATIONS

English Translation of Foreign Office action issued in related Japanese Application 2008-553516, drafted Feb. 23, 2012, translated Mar. 26, 2012.
Foreign Office Action, State of Israel Patent Office, Issued Jan. 3, 2012, Re: Application No. 169781.
Topolcic et al., Experimental Internet Stream Protocol, Version 2 (ST-II), CIP Working Group, Oct. 1990, pp. 1-149.
Mao et al., MOT: Memory Online Tracing of Web Information System, 2002, pp. 271-277, Tsinghua University, Beijing, P.R. China; City University of Hong Kong, Hong Kong.

* cited by examiner

*Primary Examiner* — Nicholas Sloms
(74) *Attorney, Agent, or Firm* — Lowe Grahams Jones PLLC

(57) ABSTRACT

A protocol circuit layer is described. The protocol circuit layer may employ a routing layer to determine optimal routes when establishing a circuit. The circuit layer may employ a link layer to send data packets over links to other network nodes. A naming layer may employ circuits to establish a distributed database of associations between network node addresses and their network locations.

14 Claims, 14 Drawing Sheets

| LocalLegID (32) |
|---|

*FIG. 11*

PROTOCOL CIRCUIT LAYER

CROSS-REFERENCE TO RELATED APPLICATION(S)

This application is a continuation of U.S. Utility Patent Application Ser. No. 12/278,144 entitled "PROTOCOL CIRCUIT LAYER," filed on Aug. 1, 2008, and which will issue as U.S. Pat. No. 8,208,466 on Jun. 26, 2012, and which is a U.S. National Stage Application of International Application No. PCT/US07/61488, entitled "PROTOCOL CIRCUIT LAYER," filed Feb. 1, 2007, which claims the benefit of U.S. Provisional Patent Application Ser. No. 60/763,977 entitled "PROTOCOL CIRCUIT LAYER," filed Feb. 1, 2006 and is related to U.S. Provisional Patent Application Ser. No.: 60/763,959 entitled "PROTOCOL LINK LAYER," filed Feb. 1, 2006, and U.S. Provisional Application Ser. No.: 60/764,013, entitled "CONGESTION MANEGMENT AND LATENCY PREDICTION IN CSMA MEDIA," filed Feb. 1, 2006. Accordingly, the present application claims priority to and the benefit of the filing dates of U.S. Application Ser. No. 12/278,144, International Application No. PCT/US07/61488, and Provisional Application No. 60/763,977. Further, the present application incorporates by reference U.S. Application Ser. No. 12/278,144, International Application No. PCT/US07/61488, Provisional Application No. 60/763,977, Provisional Application No. 60/763,959, and Provisional Application No. 60/764,013, herein their entireties.

BACKGROUND

Computers have been networked to exchange data between them for decades. One important network, the Internet, comprises a vast number of computers and computer networks interconnected through communication channels. The Internet is used for various reasons, including electronic commerce, exchanging information such as electronic mail, retrieving information and doing research, and the like. Many standards have been established for exchanging information over the Internet, such as electronic mail, Gopher, and the World Wide Web ("WWW"). The WWW service allows a server computer system (i.e., web server or web site) to send graphical web pages of information to a remote client computer system. The remote client computer system can then display the web pages. Each resource (e.g., computer or web page) of the WWW is uniquely identifiable by a Uniform Resource Locator ("URL"). To view a specific web page, a client computer system specifies the URL for that web page in a request (e.g., a HyperText Transfer Protocol ("HTTP") request). The request is forwarded to the web server that supports that web page. When that web server receives the request, it sends the requested web page to the client computer system. When the client computer system receives that web page, it typically displays the web page using a browser. A browser is typically a special purpose application program for requesting and displaying web pages.

Currently, web pages are often defined using HyperText Markup Language ("HTML"). HTML provides a standard set of tags that define how a web page is to be displayed. When a user makes a request to the browser to display a web page, the browser sends the request to the server computer system to transfer to the client computer system an HTML document that defines the web page. When the requested HTML document is received by the client computer system, the browser displays the web page as defined by the HTML document. The HTML document contains various tags that control the display of text, graphics, controls, and other features. The HTML document may contain URLs of other web pages available on that server computer system or on other server computer systems.

New protocols exist, such as Extensible Mark-up Language ("XML") and Wireless Access Protocol ("WAP"). XML provides greater flexibility over HTML. WAP provides, among other things, the ability to view web pages over handheld, wireless devices, such as cell phones and portable computers (e.g. PDA's). All of these protocols provide easier ways to provide information to people via various data processing devices. Many other protocols and means for exchanging data between data processing device continue to develop to further aid the exchange of information.

BRIEF DESCRIPTION OF THE DRAWINGS

FIG. 11 is a block diagram illustrating CRST, CCLS, and CLINK packet formats employed in some embodiments.

DETAILED DESCRIPTION

The Circuit Layer in Context

Figure 1:
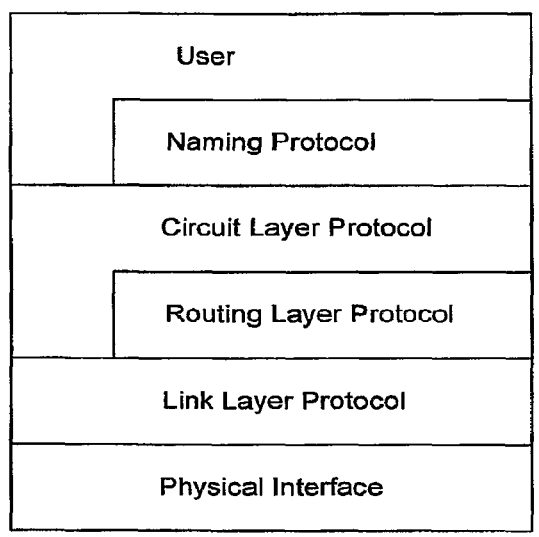
FIG. 1 is a block diagram illustrating various network architecture layers of a CoCo communications protocol in various embodiments.

The CoCo Protocol comprises four layers that mediate between the user and the physical interface; these are:
The link layer
The routing layer
The circuit layer
The naming system layer FIG. 1 illustrates the relationship of these layers.

Figure 2:
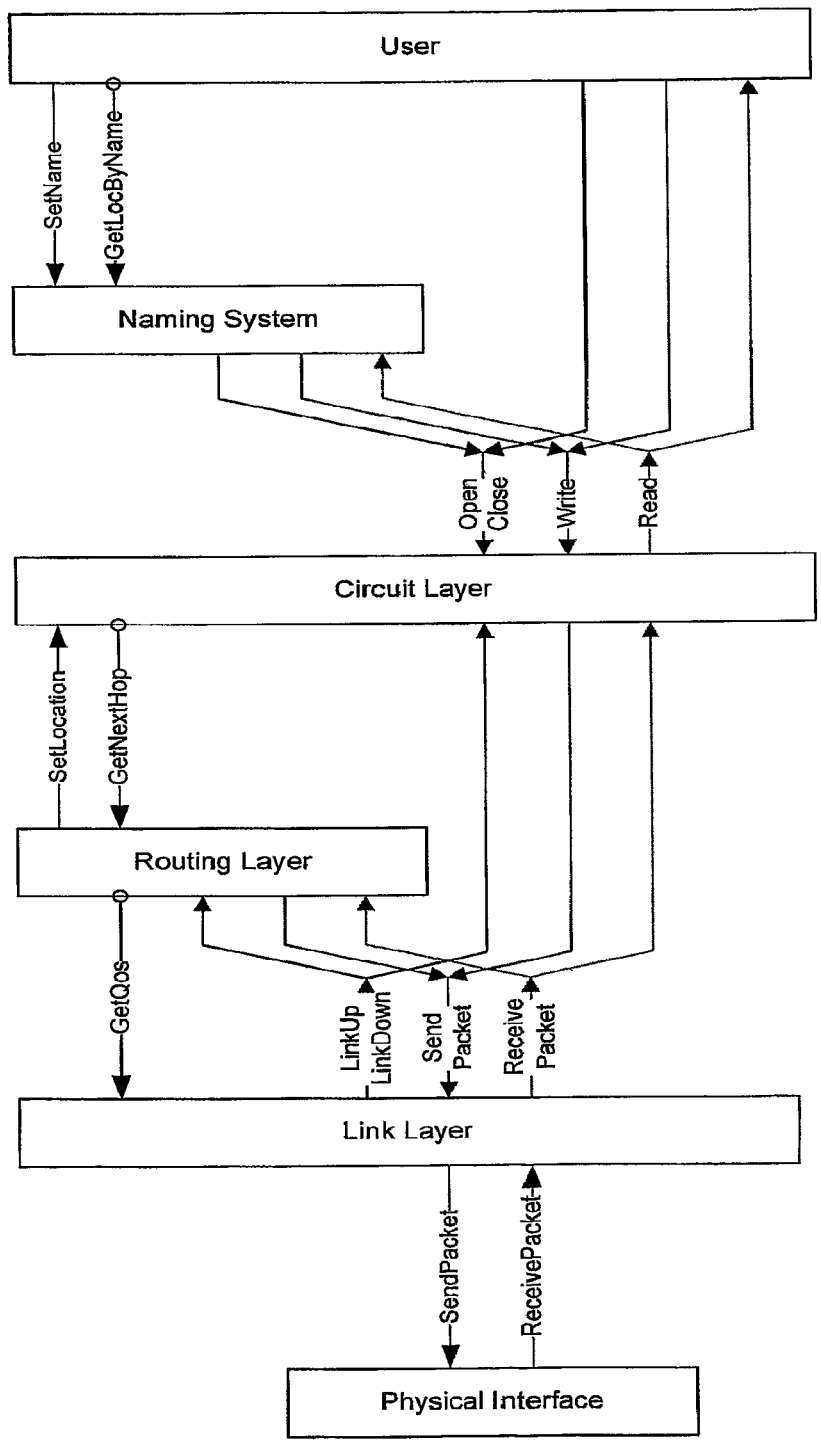
FIG. 2 is a block diagram illustrating interfaces between a circuit layer and the other layers in various embodiments.

The circuit layer occupies a central role among these layers since it can interact with every other protocol layer as well as user applications. FIG. 2 shows interfaces between the circuit layer and the other layers, which illustrates the interactions more explicitly. The circuit layer uses the routing layer to determine optimal routes when establishing a circuit. The circuit layer uses the link layer to send data packets over links to other network nodes. The naming layer uses circuits to establish a distributed database of associations between network node addresses and their network locations. User applications use the circuit layer to establish an end-to-end network connection with a remote network node.

The Circuit Abstraction

A circuit is a programming abstraction that represents an end-to-end flow of data—a connection from a network source to a network destination. Sources and destinations are represented by <service, node> pairs; that is, a service that run on a particular node. Services may be Internet Protocol standards such as FTP or Telnet, but may also encompass voice and video stream applications. Service names should be well-known so that if any set of CoCo networks are joined, the services will not clash and will interoperate across the larger, joined network. In this context, a well-known service is analogous to notion of a well-known port for Internet protocols; for example, Telnet uses port 23. The Internet Assigned Numbers Authority (IANA), an organization chartered by the Internet Society (ISOC), is the central coordinator for the assignment of unique parameter values for Internet protocols. At present, CoCo Communications Corporation provides this service. Once the CoCo Protocol becomes accepted by a recognized standards body, CoCo Communications will shift this responsibility to a similar authority.

The source node, source service, destination node, and destination service uniquely identify the circuit throughout the network, so circuits may be identified by the following 4-tuple:

<source rode, source service, destination node, destination service>

While the source and destination of a circuit will typically use the same type of service, specifying a circuit by using both a source service and a destination service allows multiple connections between two nodes for the same type of service; for example, more than one FTP session can be established at the same time between the same client and server computers by specifying different source services (one being the true service and the others being dummy duplicates).

Figure 3:
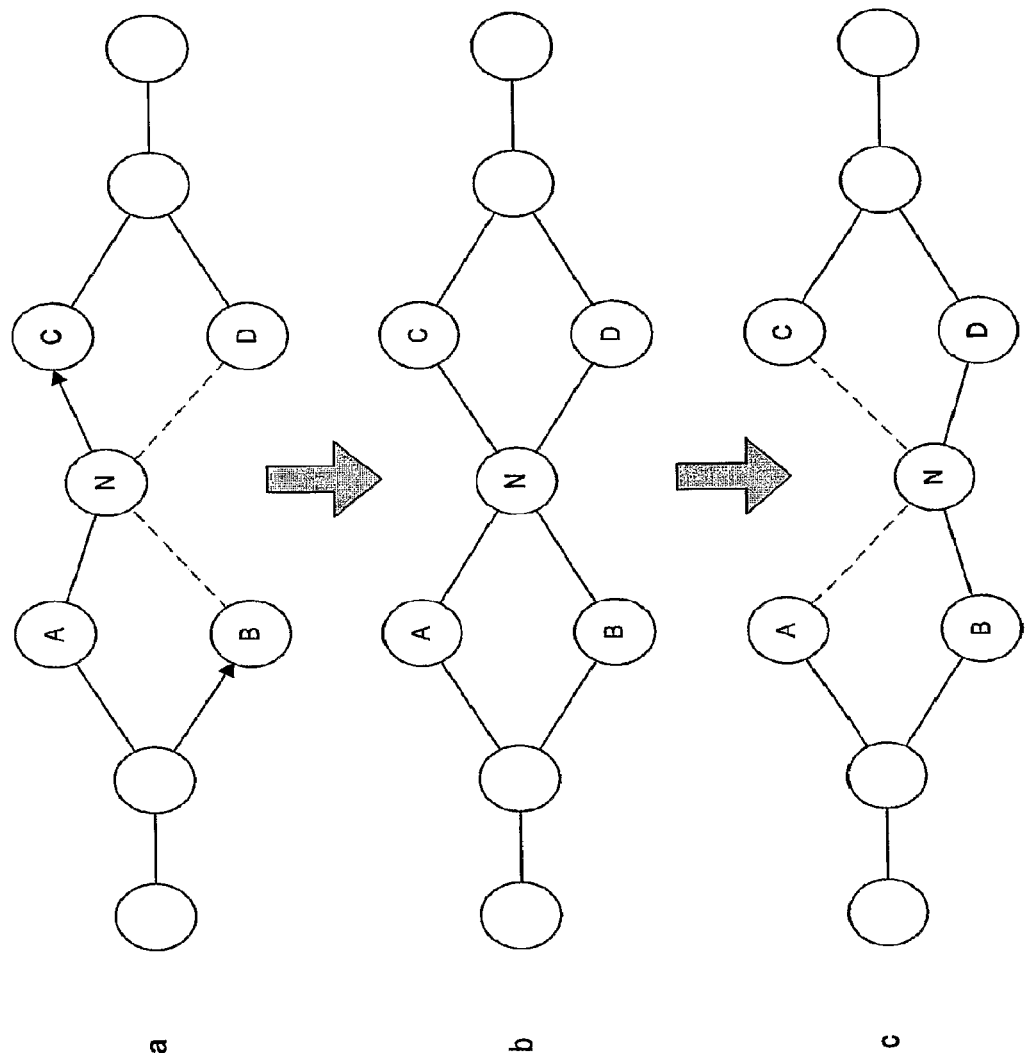
FIG. 3 is a block diagram illustrating multiple network paths in various embodiments.

Circuits are unidirectional; if a user application requires two-way communication, it should establish a circuit in each direction. A circuit may travel over multiple paths, and it may adjust any path it uses over time to accommodate changing network conditions, as shown in FIG. 3. As an example, hen network connections are unavailable, such as network connections directly between nodes B and N, and N and D (such as in example a of FIG. 3), other routes can be selected.

Each network node maintains state information about the existence and status of circuits that pass through it. Circuits are established and destroyed at the request of user applications and the naming system layer.

The part of a circuit that traverses a single link is called a leg, and a collection of legs compose a circuit. The next section discusses legs in more detail.

Legs

Figure 4:
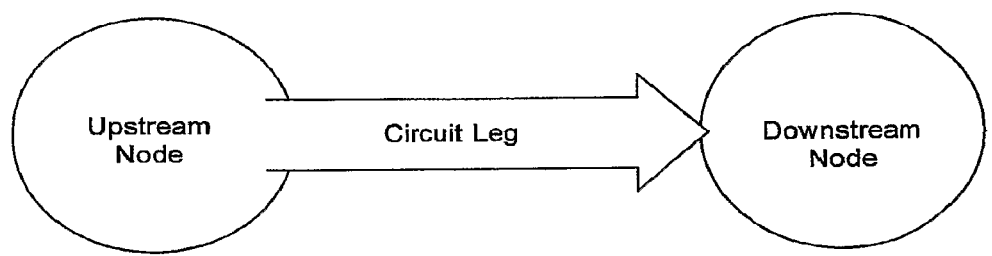
FIG. 4 is a block diagram illustrating a circuit leg in some embodiments.

FIG. 4 is a block diagram illustrating a circuit leg. A leg of a circuit represents a single hop between adjacent nodes that is part of a circuit's path. A leg has an upstream node and a downstream node, which are one hop apart. By construction, the upstream node is closer to the circuit's source node and the downstream node is closer to the circuit's destination node. The details of circuit establishment are discussed in the "Circuit Control Processes" section.

Figure 5:
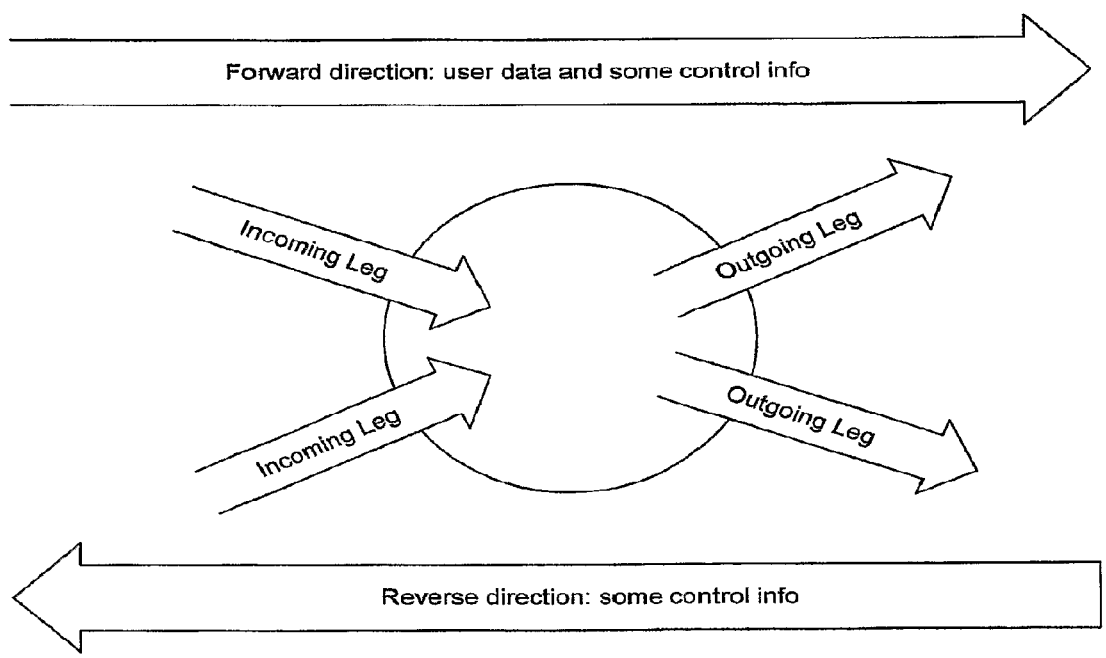
FIG. 5 is a block diagram illustrating directionality in network packets in some embodiments.

FIG. 5 is a block diagram illustrating directionality in network packets. All user data and some control data flow over a leg from the upstream node to the downstream node; the direction of dataflow is referred to as forward or downstream. Some control data flows in the opposite direction, called the reverse or upstream direction. The section "Circuit Control Packets" describes the packet formats for data control packets.

From the perspective of a leg's upstream node, the leg is called an outgoing leg. From the perspective of the downstream node, the leg is called an incoming leg.

Nodes

The source and destination nodes of any circuit are called endpoints. All intermediate nodes are called waypoints.

Figure 6:
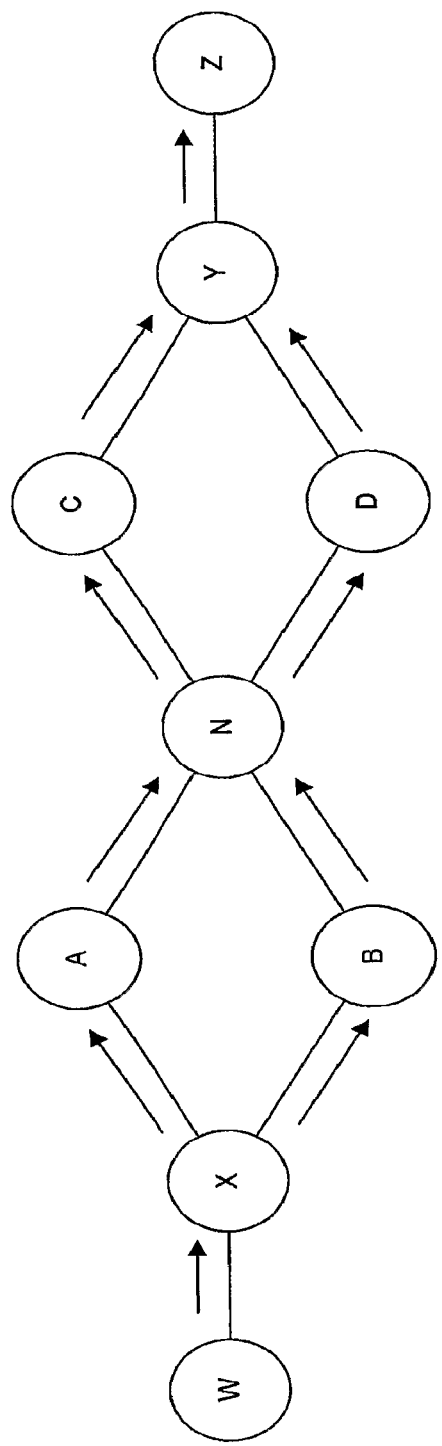
FIG. 6 is a block diagram illustrating endpoints and waypoints in various embodiments.

In FIG. 6, node W is the source and node Z is the destination these are the endpoints. Nodes X, A, B, N, C, D, and Y are the waypoints. An Arrow along each edge indicates the direction of flow.

Figure 7:
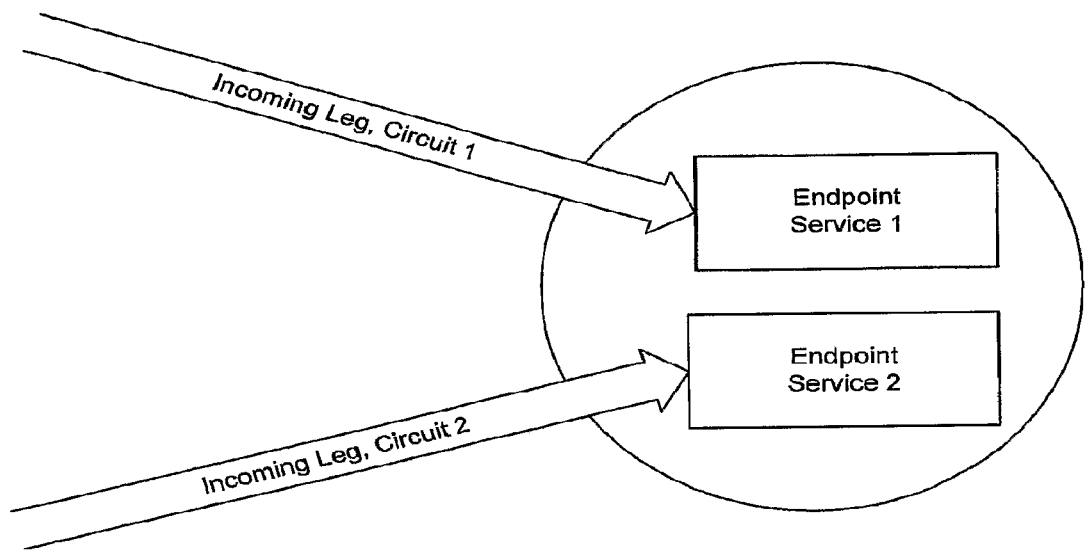
FIG. 7 is a block diagram illustrating network node serving as an endpoint for two circuits.

FIG. 7 illustrates a node serving as a circuit destination endpoint for two distinct circuits, each connected to a separate service.

Identification

The only identifying information about a circuit is its 4-tuple: <source node, destination node, source service, destination service>.

Each leg has an identifier, known as a LocalLegID, which should be unique for all other legs going over the same link, between the same two nodes, and in the same direction. A LocalLegID does not completely specify a leg. Each LocalLegID is specific to a link and an <upstream node, downstream node> pair. For example:

Two legs going in different directions with the same LocalLegID are not the same leg, but are rather two different legs, each belonging to a different circuit.

Two legs leaving the same node to different destinations, going out different links, with the same LocalLegID are also not the same leg.

Therefore, a leg incident to a node is not specified by its LocalLegID alone. To specify a leg uniquely also requires a link and a direction on that link (a triple of the form <direction, LinkID, LocalLegID>) where direction may be either incoming or outgoing. Different legs of the same circuit may have different LocalLegID values, so a LocalLegID does not completely determine a circuit. (That is why they are called local leg identifiers—the identifier refers to a circuit leg locally at a particular node.)

Extensions

A circuit extension is a mechanism that handles circuits with special requirements. Two examples of circuit extensions are:

Circuits that require end-to-end encryption

Circuits that should satisfy specific QoS requirements such as voice quality

Circuit extensions can affect circuit behavior, including routing. A circuit extension may be optional or required for both waypoints and endpoints. For example, the encryption extension requires the endpoints to support encryption, but waypoints need not, since each waypoint merely sends on its outgoing legs what it receives on its incoming legs. By contrast, a circuit with a voice quality QoS extension requires each waypoint to have incoming and outgoing legs with sufficient bandwidth to satisfy the end-to-end voice requirements.

Not all nodes should implement every extension, but if a circuit requires a particular extension, any node not supporting that extension may not be usable by that circuit. A circuit may use a node that does not support an extension if that extension is optional for that circuit; in this case, the node uses its default behavior. If an extension is required, and the node does not support it, the circuit will not be established.

Each extension is associated with a unique and well-known number, which is analogous to well-known ports in IP.

Circuit Control Packets

There are six different circuit packets, three of which travel only in the forward or downstream direction over legs, and three of which travel only in the reverse or upstream direction.

The forward circuit packets include:
CDAT (Circuit Data) packets move actual user data over a circuit
CEST (Circuit Establishment) packets set up a circuit
CCLS (Circuit Close) packets shut down a circuit The reverse circuit packets include:
CACK (Circuit Acknowledge) packets acknowledge circuit establishment
CRST (Circuit Reset) packets reject a circuit or indicates a failure
CUNK (Circuit Unknown) packets indicate that a circuit is unknown or has been forgotten When the CoCo Protocol link layer receives a data packet, the 8-bit type field in the link layer data packet header (see [BM]) contains a value that specifies the packet type. If the packet type is one of the above six types of circuit layer packets, the link layer forwards the packet to the circuit layer and communicates the packet type directly to the circuit layer (through the OnReceivePacket call). These are the type field values corresponding to the circuit layer packet types:

| Type field value | Packet Type |
|---|---|
| 128 | CDAT packet |
| 129 | CEST packet |
| 130 | CCLS packet |
| 131 | CACK packet |
| 132 | CRST packet |
| 133 | CUNK packet |

Packet Formulas

FIG. 8 through FIG. 13 illustrate the packet formats, such as packet header formats, for circuit control packets. Packet headers do not contain an encoding of the packet type because that is already present in the link layer header. Since the link layer already knows the type, it is unnecessary to repeat this information in the circuit layer header.

The link layer obtains the source and destination addresses from the Ethernet/physical layer frame header. The circuit layer obtains the linkID and packet type from the link layer, which calls the circuit layer API entry point CircuitReceivePacket (u32 linkID, u8 type, Data buffer) when it has received data from the physical layer that it should relay to higher layers.

The "Circuit Control Processes" section explains how the circuit layer protocol uses the circuit control packets described in the preceding "Circuit Control Packets" section.

Figure 8:
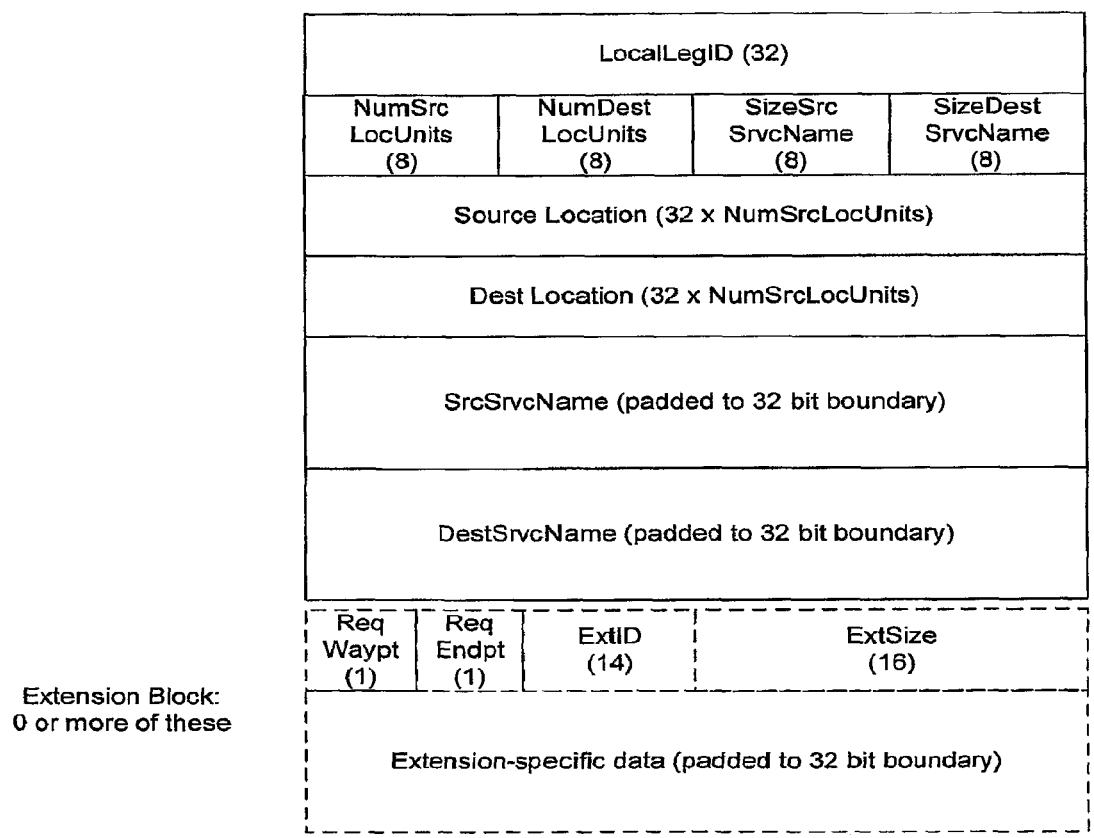
FIG. 8 is a block diagram illustrating a CEST packet format employed in some embodiments.

The CEST packet format, shown in FIG. 8, contains a LocalLegID that identifies the packet to the downstream (recipient) node of the leg. The downstream node detects the link on which the packet arrives, so it has sufficient information to determine which circuit this CEST packet is attempting to establish and adds the entry <incoming, LinkID, LocalLegID> to its circuit table. The remaining fields serve to identify the location and service name of the source and destination nodes.

NumSrcLocUnits is an 8 bit field that contains n, the number of location units in the location of the source. The location of the source is comprised of n Unique Node Identifers (UNIs), where n is the current number of cluster levels in the network. For information about clusters, see [BLMS].

NumDestLocUnits is an 8 bit field that contains n, the number of location units in the location of the destination. The location of the source is comprised of n Unique Node Identifers (UNIs), where n is the current number of cluster levels in the network.

SizeSrcSrvcName is the size, specified in bytes, of the name of the source service. The size of a service name can be the number of bytes required for its representation in UTF-8.

SizeDestSrvcName is the size, specified in bytes, of the name of the destination service.

Source Location gives the location of the node requesting the circuit. The location is comprised of n UNIs, where n is the value in the NumSrcLocUnits field.

Destination Location gives the location of the node requesting the circuit. The location is comprised of n UNIs, where n is the value in the NumSrcLocUnits field.

Source Service Name is the name of the service on the source node, represented as a UTF-8 string.

Destination Service Name is the name of the service on the destination node, represented as a UTF-8 string.

Figure 9:
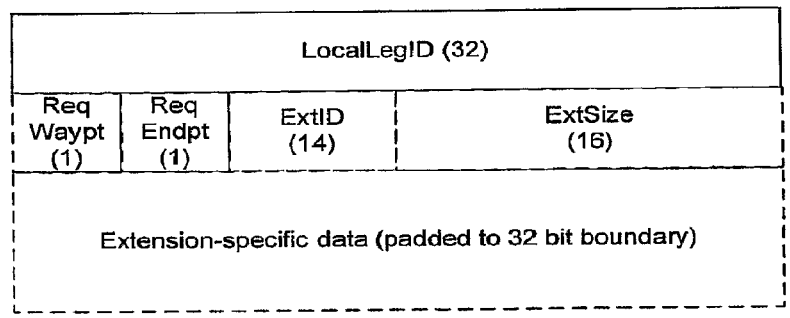
FIG. 9 is a block diagram illustrating a CACK packet format employed in some embodiments.

The CACK packet format, shown in FIG. 9, contains a LocalLegID that identifies the packet to the upstream (recipient) node of the leg. The upstream node is familiar with the link on which the packet arrives, so it has sufficient information to determine which circuit this CACK packet is attempting to acknowledge.

Extension blocks contain extension-specific answers to extension-specific requests (for example, a leg's QoS capabilities and cryptographic handshake information).

Figure 10:
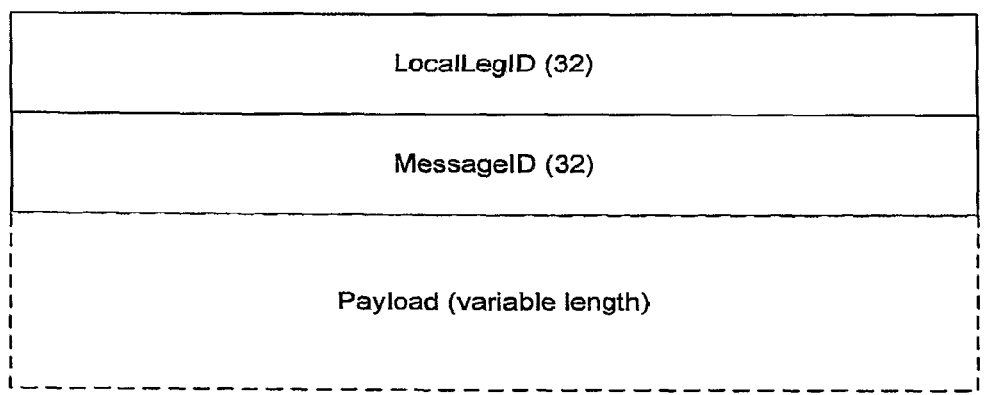
FIG. 10 is a block diagram illustrating a CDAT packet format employed in some embodiments.

The CDAT packet header format, shown in FIG. 10, contains a LocalLegID that identifies the packet to the downstream (recipient) node of the leg. The MessageID field increases sequentially for each packet sent over the circuit so the receiver can detect which and how many packets have dropped. The circuit layer may use this information for determining the quality of service that each leg can support.

Figure 11:
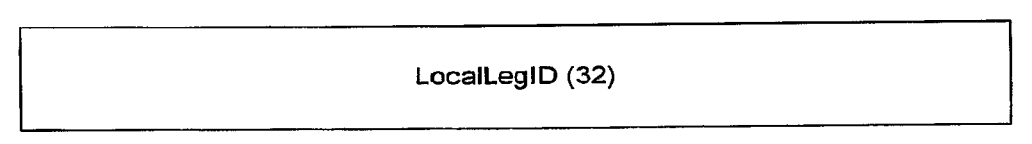

The CRST, CCLS, and CLINK packets consist solely of a LocalLegID, as shown in FIG. 11. As with the packet headers for other types of circuit packets, the type itself is known to the recipient node because it appeared in the link layer header and the link layer passes it to the circuit layer in the OnReceivePacket (LinkID, Type, Packet) call.

Legs as Header Compression

One way to view the leg concept is as a local header compression mechanism. Every circuit data packet could include the entire 4-tuple and all the relevant options, which is how the Transfer Control Protocol works. In this case, including the 4-tuple <source node, source service, destination node, destination service> in the data packet would not require intermediate nodes to maintain state information about related circuits. It would also make the protocol simpler and easier to implement. However, a stateless circuit protocol precludes the possibility of bandwidth capacity reservation for QoS management, requires more memory for larger and more complex packets, and is appreciably slower since the routing decision logic should be performed for every packet.

Conceptually, knowing a LocalLegID for a given link and direction determines a circuit. Although a leg is a local concept over a single hop, a LocalLegID (together with its direction and the link it uses) is a key to reference the whole circuit; the section "Circuit Layer Data Structures" describes the mechanisms for this. This concept allows all repeat work done for every packet over a single network connection to occur only once while the circuit is established. This reduces the routing logic for each packet to a trivial table lookup, so it is fast. This approach also permits QoS negotiation, link capacity reservation, and a mechanism for end-to-end encryption.

Circuit Layer Data Structures

The circuit control process specifications require the existence of two tables on each node, a circuit table and a leg table.

The Circuit Table

Figure 12:
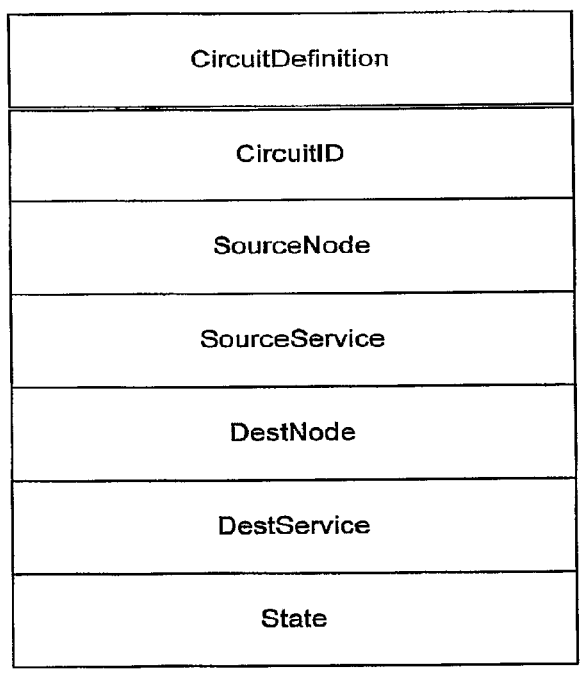
FIG. 12 is a block diagram illustrating a circuit table employed in some embodiments.

FIG. 12 is a block diagram illustrating a circuit table employed in some embodiments. The circuit table on a node contains an entry for each circuit that uses the local node. Circuits are represented by 4-tuples: circuit=<source node, source service, dest node, dest service>. Each circuit is completely determined by this 4-tuple. For ease of use, each 4-tuple is also associated with a 32-bit CircuitID field that uniquely determines specifies the circuit, an lookup a 4-tuple and obtain a circuit ID. Each circuit has a state that is either opening or Ready. Even though the CircuitID and the associated 4-tuple each specify a circuit, it is useful to maintain the Circuit ID to cross-reference with the Leg Table.

The Leg Table

Figure 13:
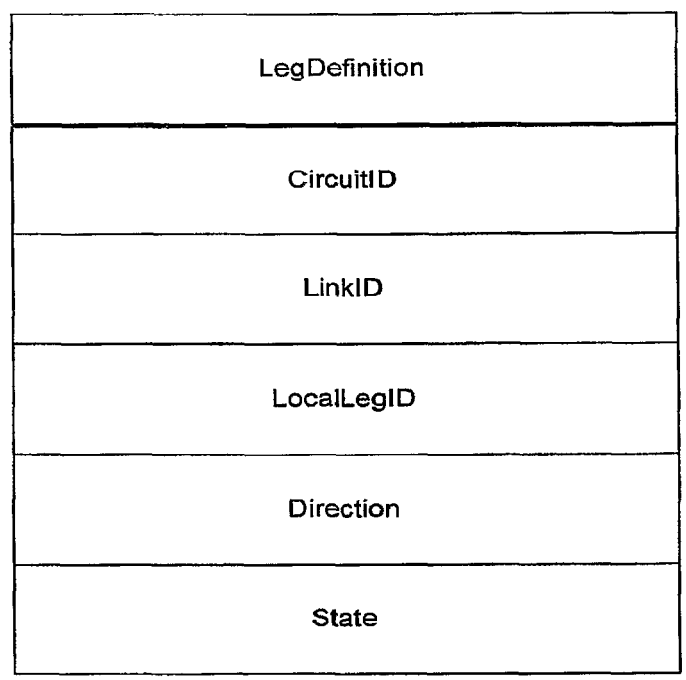
FIG. 13 is a block diagram illustrating a leg table employed in some embodiments.

FIG. 13 is a block diagram illustrating a leg table employed in some embodiments. The leg table contains an entry for each leg that is incoming to and outgoing from the local node. This entry includes the circuitID of the circuit that contains the leg. Legs are represented by triples: leg=<direction, LinkID, LocalLegID>. Leg table entries consist of a CircuitID, a leg L, and a state s, where L is part of the circuit specified by CircuitID and is in state s.

The three fields LinkID, LocalLegID, and direction collectively form a key for this table, so given such <LinkID, LocalLegID, direction> triple, it is possible to efficiently obtain the associated CircuitID and State fields, to determine which circuit this leg is part of, and the state of the leg, respectively.

Figure 14:
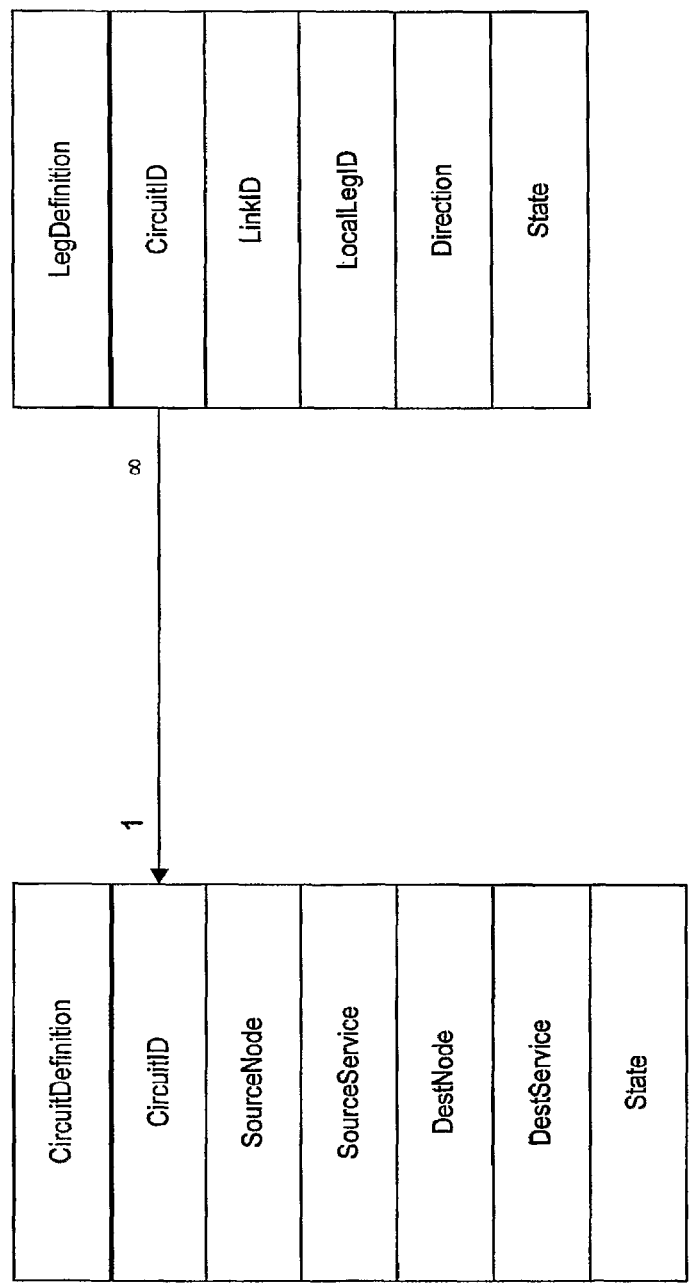
FIG. 14 is a block diagram illustrating a relationship between a circuit table and a leg table.

The leg table and the circuit table are related by the CircuitID field, as is illustrated in FIG. 14. For example, it is possible to obtain all the legs associated with a circuit specified by a given CircuitID by finding all the entries in the leg table with that CircuitID. The following diagram illustrates this relationship, and indicates that it is possible for one circuit to have multiple legs entering and/or leaving a node.

Table Operations

The circuit and leg tables support the following functions:

State(CircuitID)

Given a CircuitID, this function returns the state of the circuit. The state is either opening or Ready. Given the structure of the circuit table, this operation is simple to implement: find the circuit table entry with the given CircuitID and return the state field of that entry.

State(<LinkID, LocalLegID, direction>)

State(Leg)

Given a leg specified by a LinkID, LocalLegID, and direction, this function returns the state of the leg. The state is either Opening or Ready. Given the structure of the circuit table, this operation is simple to implement: find the leg table entry with the given LinkID, LocalLegID, and direction, and return the state field of that entry.

For notational convenience, we may write leg=<LinkID, LocalLegID; direction>. Here, leg is simply a shorthand for the triple. For example, we might write:

```
{
    ...
    Leg = <LinkID, LocalLegID, direction>
    if State(Leg) == ready then
    ...
}
```

UpdateLegState(Leg, State)

This procedure updates the state of Leg to State.

UpdateCircuitState(Circuit, State)

This procedure updates the state of Circuit to State.

IncomingLegs(CircuitID)

Given a CircuitID, returns the set of incoming legs on the local node. Using the structure of the leg table, this operation may be implemented by scanning the leg table for all rows (entries) that have the given CircuitID field where the direction field is incoming and returning the corresponding LinkID/LocalLegID pairs.

OutgoingLegs(CircuitID)

Given a CircuitID, returns the set of outgoing legs on the local node. Using the structure of the leg table, this operation may be implemented by scanning the leg table for all rows (entries) that have the given CircuitID field where the direction field is outgoing and returning the corresponding LinkID/LocalLegID pairs.

GenerateNewCircuitID( )

This function returns a value that is currently unused as a CircuitID (and hence available for use as the CircuitID for a new circuit).

GenerateNewLocalLegID( )

This function returns a value that is currently unused as a LocalLegID (and hence available for use as the LocalLegID for a new leg).

AddCircuit(Src node, Src service, Dest node, Dest service, CircuitID, State)

This operation adds a circuit to the circuit table.

AddLeg(LinkID, LocalLegID, Direction, State, CircuitID)

This operation adds the leg specified by LinkID, LocalLegID and direction to the circuit specified by CircuitID. This operation builds a new leg, represented by a triple <LinkID, LocalLegID, Direction> where direction is either incoming or outgoing, and adds this leg to the leg table. Using the structure of the leg table, this operation may be implemented by checking that the circuit exists (checking that CircuitID occurs in the circuit table), and adding a new table entry with the given parameters.

CircuitID(<LinkID, LocalLegID, direction>)

CircuitID(Leg)

Given a triple <LinkID, LocalLegID, direction>, obtain the circuit to which it belongs by returning the associated CircuitID.

CircuitID(<Src node, Src service, Dest node, Dest service>)

CircuitID(Circuit)

This function returns the CircuitID of Circuit.

RemoveLeg(<LinkID, LocalLegID, Direction>)

RemoveLeg(Leg)

For each circuit that uses the leg specified by LegID, removes the <CircuitID, LegID> association in the circuit and leg tables. If that association is the only one associated with a circuit, that circuit is also removed from the circuit table.

RemoveCircuit(CircuitID)

This operation removes the circuit specified by CircuitID from the circuit table.

Circuit Control Processes

Circuit control processes, such as the establishment and closing of circuits and the transmission of data over circuits, may be described by state machines or in a pseudocode format. Using the state machine approach, each incoming and outgoing leg is governed by a state machine. Complexities arise because a status change in an incoming leg may cause the creation of one or more new state machines to describe outgoing legs. Moreover, the state machines differ slightly depending on whether the node is a waypoint or an endpoint. For these reasons, the following sections use a high-level pseudocode to specify circuit control processes.

Leg Manipulation Primitives

Definition The cost of reaching node Y from node X is denoted by cost(X, Y)

Definition For any nodes S, N, and D, downhill(S, N, D) is true if cost(N, D)<cost(S, D).

Definition A downhill link from node S to node D connects node S to node N, for which downhill(S, N, D) is true.

1.1.1.1.1 GetDownhillLinkSet

When a circuit control process that is running on node N calls the LinkSet=GetDownhillLinkSet (destLocation) function, it obtains the set of all downhill links from node N to destLocation by calling the routing layer API function GetNextHops(destLocation).

1.1.1.1.2 CreateLegSet

After the circuit layer of node N calls GetDownhillLinkSet to obtain a set of downhill links toward a network destination, node D, it calls LegSet=CreateLegSet (Linkset) to obtain a cost-effective set of legs across which the node N circuit layer will send CEST packets to continue building a circuit to node D. The following pseudocode outlines the CreateLegSet procedure.

```
function CreateLegSet(CircuitID) returns LegSet
{
    LinkSet ← GetDownHillLinkSet(CircuitID.dest);
    OutgoingLegs ← OutgoingLegs(CircuitID);
    IncomingLegs ← IncomingLegs(CircuitID);
    RefinedLinkSet ← LinkChoosingStrategy(LinkSet, OutgoingLegs)
    // if no outgoing legs remain, the circuit is not viable;
    // send CRST messages to all incoming legs and remove them.
    if RefinedLinkSet is empty then
        for each Leg in IncomingLegs
            Send a CRST on Leg;
            RemoveLeg(Leg); // remove Leg from leg table
        RemoveCircuit(CircuitID);
    else
        // construct legs out of links returned by RefinedLinkSet
        // that are not already in OutgoingLegs.
        for each LinkID in RefinedLinkSet
            if LinkID is not in OutgoingLegs then
                LocalLegID ← GenerateNewLocalLegID( );
                // add new outgoing leg to circuit
                AddLeg(CircuitID, LinkID, LocalLegID,
                       outgoing,opening);
                Send a CEST on LocalLegID;
        // remove the legs of the circuit that are in
        // OutgoingLegs but that aren't in RefinedLinkSet.
        for each Leg in OutgoingLegs but not in RefinedLinkSet
            Send a CCLS packet on Leg;
            RemoveLeg(Leg); // removes Leg from leg table
        return RefinedLinkSet
}
```

1.1.1.1.3 PerPacketLegSet

The PerPacketLegSet (CircuitID, Packet) function determines along which of the legs returned by CreateLegSet( ) the circuit layer should send Packet. The internal logic for PerPacketLegSet is a function of the circuit QoS requirements and other possible circuit extension requirements.

Circuit Establishment

When a node receives a CEST packet on an incoming leg, it executes the OnCEST procedure, as outlined in the following pseudocode.

```
procedure onCEST(LinkID, Packet)
{
    Circuit ← (<Packet.src, Packet.srcSvc,
              Packet.dest, Packet.destSvc>)
    if Circuit is in circuit table
        CircuitID ← CircuitID(Circuit)
        UpdateCircuitState(CircuitID, opening);
    else // Circuit is not in circuit table
        // get a new, unused CircuitID
        CircuitID ← GenerateNewCircuitID( );
        // add new entry to circuit table
        AddCircuit(CircuitID, Circuit, opening);
    IncomingLegs ← IncomingLegs(CircuitID);
    if no leg in IncomingLegs uses LinkID then
        LocalLegID ← GenerateNewLocalLegID( );
        Leg ← <LinkID, LocalLegID, incoming>
        AddLeg(CircuitID, Leg, opening);
    else // destroy all other incoming legs from LinkID
        // associated with Circuit
        for each leg in IncomingLegs
            if leg ≠ Leg then
                RemoveLeg(leg);
    if Circuit.Dest == local machine then
        // send to local link layer
        Update CircuitState(Circuit, ready);
        Signal new inbound connection on NewCircuit.destService;
    else
        // find appropriate legs, send CESTs, update tables
        CreateLegSet(Circuit);
    if State(Circuit) == Ready then
        for each leg in IncomingLegs
            send a CACK on leg;
}
```

Circuit Close

When a node receives a CCLS packet on an incoming leg, it executes the OnCCLS (LegID) procedure, as outlined in the following pseudocode.

```
procedure onCCLS(LinkID, LocalLegID)
{
    // find CircuitID for the circuit, that LocalLegID belongs to
    CircuitID ← circuit(CircuitTable, LocalLegID);
    IncomingLegs ← IncomingLets(CircuitID)
    Leg ← LegTable(LegID);
    if (Leg) then
        RemoveLeg(LegTable, LegID);
        if IncomingLegs is empty then
            RemoveCircuit(CircuitID);
}
```

Circuit Reset

When a node receives a CRST packet on an outgoing leg, it executes the OnCRST (LegID) procedure, as outlined in the following pseudocode.

```
procedure OnCRST(LegID, P)
{
    Leg ← LegTable(LegID);
    if (Leg) then
        RemoveLeg(LegTable, LegID);
    // Find appropriate legs, send CESTs, and update tables.
    CreateLegSet(CircuitID);
}
```

Circuit Acknowledgement

When a node receives a CACK packet on an outgoing leg, it executes the OnCACK(LegID) procedure, as outlined in the following pseudocode.

```
procedure OnCACK(LinkID, LocalLegID)
{
    Leg ← <LinkID, LegID, outgoing>;
    if Leg is not in leg table then
        Send CCLS(LegID) on link LinkID (to sender of CACK);
    else
        if State(Leg) ≠ Ready then
            UpdateLegState(Leg, ready);
        CircuitID ← CircuitID(Leg);
        IncomingLegs ← IncomingLegs(CircuitID);
        if State(Circuit) ≠ Ready then
            for each Leg in IncomingLegs
                Send CACK to Leg;
        UpdateLegState(Leg, ready);
}
```

Circuit Data

When a node receives a CDAT packet on an incoming leg, it executes the OnCDAT(LegID) procedure, as outlined in the following pseudocode.

```
procedure OnCDAT(LinkID, LocalLegID, Packet)
{
    Leg ← <LinkID, LocalLegID, incoming>
    if Leg is not in leg table then
        Send CUNK(LegID) on LinkID;
    else
        CircuitID ← CircuitID(Leg);
        if CircuitID.dest == local machine then
            forward Packet to CircuitID.destService;
            Deliver Data to user buffer associated with circuit;
            Alert any pending reads;
        else
            LegSet ← PerPacketLegSet(CircuitID, Packet);
            for each Leg in LegSet
                Send CDAT packet containing Packet on Leg;
            if the Qos model requires leg set recomputation then
                // find appropriate legs, send CESTs, update tables
                CreateLegSet(CircuitID);
}
```

Circuit Unknown

When a node receives a CUNK packet on an outgoing leg, it executes the OnCUNK(LegID) procedure, as outlined in the following pseudocode.

```
procedure OnCUNK(LinkID, LocalLegID)
{
    Leg ← <LinkID, LocalID, outgoing>
    if Leg is in the leg table then
        UpdateLegState(Leg, opening);
        CircuitID ← CircuitTable(LegID);
        // find appropriate legs, send CESTs, update tables
        CreateLegSet(CircuitID);
}
```

Circuit Layer API

The circuit layer API consists of the following procedures. Some are accessed by user application programs. Others are accessed by the link layer.

When a node receives a packet from the link layer, it executes the OnRecvPacket( ) procedure, as outlined in the following pseudocode.

```
procedure Circuit::OnRecvPacket(LinkID, Type, Packet)
{
    Switch on Type
```

```
        CDAT:
            Leg ← <LinkID, LocalLegID, Incoming>;
            OnCDAT(Leg, Packet);
        CEST:
            Leg ← <LinkID, LocalLegID, Incoming>;
            OnCEST(Leg, Packet);
        CCLS:
            Leg ← <LinkID, LocalLegID, Incoming>;
            OnCCLS(Leg, Packet);
        CACK:
            Leg ← <LinkID, LocalLegID, Outgoing>;
            OnCACK(Leg, Packet);
        CRST:
            Leg ← <LinkID, LocalLegID, Outgoing>;
            OnCRST(Leg, Packet);
        CUNK:
            Leg ← <LinkID, LocalLegID, Outgoing>;
            OnCUNK(Leg, Packet);
}
```

After a no data has arrived on a circuit for a specified timeout period, the circuit layer executes the OnTimeout procedure, as outlined in the following pseudocode.

```
procedure Circuit::OnTimeout(CircuitID)
{
    // executed after timer expires and no data received
    Destroy all the legs and data associated with CircuitID;
    Send no packets;
}
```

When the link layer detects that a link has closed, it calls the LinkDown procedure in the circuit layer, as outlined in the following pseudocode.

```
procedure Circuit::LinkDown(LinkID)
{
    for each leg L that is incoming over LinkID
        simulate the reception of a CCLS to L;
    for each leg L that is outgoing over LinkID
        simulate the reception of a CRST to L;
}
```

When the link layer detects that a link has been established, it calls the
LinkUp procedure in the circuit layer, as outlined in the following pseudocode.

```
// reserved for future use; here for symmetry
procedure Circuit::LinkUp( )
{
    Do Nothing;
}
```

When a user application establishes a circuit with a service on a remote node, it calls the Open procedure in the circuit layer, as outlined in the following pseudocode.

```
procedure Circuit::Open(Dest, DestService, Options)
{
    Construct a 4-tuple with my address a locally unique
    srcService, and the Dest + DestService;
    Construct a Circuit based on the 4 tuple;
```

```
    // AdjustLegs
    // find appropriate legs, send CESTs, update tables
    CreateLegSet(CircuitID);
}
```

When a user application has finished using a circuit it has previously established, it calls the close procedure in the circuit layer, as outlined in the following pseudocode.

```
procedure Circuit::Close(CircuitID)
{
    Find associated Circuit Entry;
    Send CCLS on all outgoing legs;
    Destroy all legs and circuit;
}
```

When a user application expects to receive data over a circuit it has previously established, it calls the Read procedure in the circuit layer, as outlined in the following pseudocode.

```
function Circuit::Read(CircuitID) returns circuit data
{
    Find data buffer associated with CircuitID;
    if data is not available then
        Block until data ready;
    return data to User;
}
```

When a user application needs to send data over a circuit it has previously established, it calls the Write procedure in the circuit layer, as outlined in the following pseudocode.

```
procedure Circuit::Write(CircuitID, Data)
{
    if buffer associated with CircuitID is full then
        Block until it is available
    Place data in buffer associated with CircuitID
}
```

Semantic Concepts Involved
  Circuit
  Circuit establishment
  Handoff
  End-to-end connection
  Unidirectionality
  Circuit legs
  Circuit waypoints
  Circuit endpoints
  Circuit extensions
  Quality of Service support
  Well-known ports
  Network service
Conclusion The circuit layer of the CoCo Protocol provides end-to-end connections across a CoCo network. The circuit layer permits multipath circuits for increased bandwidth and better handoff management. This document summarizes the API and the packet formats used by the circuit layer.

The Circuit Layer provides at least these features:
1. A method for establishing adaptive, self-adjusting circuits in a heterogeneous communications network that is scalable and dynamic. The term protocol is used synonymously for method in this context.
    (a) A communications network is a collection of communication devices that are able to send and receive data from each other. A network device or network node is any device with sufficient computational power to execute the protocol software and a means for establishing a connection to other devices.
    (b) A heterogeneous communications network is a communications network consists of a collection of multiple types of network devices and multiple types of communication links. In other words, the network is a hybrid that may consist of devices of different type and manufacturers, including (but not limited to) mobile telephones, lap-top computers, personal digital assistants, linked among each other by either wired or wireless connections, where these connections may be established by any of various underlying transport mechanisms, including (but not limited to) Wi-Fi, Ethernet, satellite, and cellular links. Networks that are homogeneous (consisting of entirely one kind of device and/or one kind of transport mechanism) are a special case of heterogeneous communications networks.
    (c) A dynamic network permits devices to turn on and off at arbitrary times at the whim of users of these communications devices, and also where devices move geographically.
    (d) A scalable network is one that continues to work correctly and efficiently as the number of communication devices in the network grows.
2. A method for managing circuits in communication networks.
3. A method for managing circuit handoffs in the presence of dynamic changes in network topology.
4. A method for constructing circuits with a guaranteed level of Quality of Service.
5. A method for constructing circuits with a guaranteed level of end-to-end security.
6. A method for constructing multicast circuits.
7. A method for constructing end-to-end circuits utilizing the underlying routing layer described in the patent claims for CoCo clustering methodology.
8. A method for managing circuits using relational tables known as a circuit table and a leg table.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:
1. A system that enables network communications over a circuit that is identified by a circuit identifier (ID), comprising:
   a first node included in the circuit that communicates communications packets from a source node to a destination node,
       wherein the first node accesses information from a first circuit table stored at the first node that identifies the circuit by the circuit ID and that includes a 4-tuple that has an identifier of the source node, an identifier of the destination node, an identifier of a source service, and an identifier of a destination service,
       wherein the first node accesses information from a first leg table stored at the first node that identifies first legs which respectively connect the first node to one of a plurality of first adjacent nodes, and wherein the first leg table identifies each of the first legs using triples that have at least a link ID, a local leg ID, and a direction that defines a travel direction of communications packets for each of the first legs, and wherein a first triple of the first leg table is associated with the circuit ID when the first leg is a portion of the circuit, a second node adjacent to the first node and included in the circuit, wherein the second node accesses information from a second circuit table stored at the second node that identifies the circuit by the circuit ID and that includes a 4-tuple that has the identifier of the source node, the identifier of the destination node, the identifier of the source service, and the identifier of the destination service, wherein the second node accesses information from a second leg table stored at the second node that identifies second legs which respectively connect the second node to one of a plurality of second adjacent nodes, and wherein the second leg table identifies each of the second legs using a triple that has at least a link ID, a local leg ID, and a direction that defines a travel direction of communications packets for each of the second legs, and wherein a second triple of the second leg table is associated with the circuit ID when the second leg is a portion of the circuit; and a circuit link between the first node and the second node, wherein the circuit link is identified as the first leg based upon the first triple when a communications packet with the circuit ID is communicated over the first node to the second node.

2. The system of claim 1, wherein the first node determines that the communications packet is to be transmitted from the first node based on the circuit ID and based on information retrieved from the first circuit table.

3. The system of claim 2, wherein the first node selects the circuit link to transmit the communications packet to the second node based on the circuit ID and based on information retrieved from the first leg table.

4. The system of claim 3, wherein the second node determines that the communications packet is to be received from the first node based on the circuit ID and based on information retrieved from the second circuit table.

5. The system of claim 1, wherein the circuit link between the first node and the second node is identified as the second leg based upon the second triple when a return communications packet with the circuit ID is communicated over the second node to the first node.

6. The system of claim 1, wherein the source service is a first type of communication service, and the destination service is a second type of communication service that is different from the first type of communication service.

7. The system of claim 1, wherein the second node determines that the circuit link between the first node and the second is a second leg based upon the second triple, and wherein a communications packet with the circuit ID is communicated from the second node to the first node over the circuit link.

8. The system of claim 1, wherein the circuit link is a first circuit link, and further comprising:

a third node adjacent to the first node and adjacent to the second node, wherein the third node has a third leg table stored that identifies third legs which respectively connect the third node to one of a plurality of third adjacent nodes, and wherein the third leg table identifies each of the third legs using triples that have at least a link ID, a local leg ID, and a direction that defines a travel direction of communications packets for each of the third legs, where in response to a failure of the first circuit link, the first node accesses the first leg table to identify a new first circuit link between the first node and the third node, wherein the first node associates the circuit ID with the new first circuit link to identify the new first circuit link in its first circuit table as a portion of the circuit between the source node and the destination node, wherein the first node sends a circuit establishment packet over the new first circuit link to the third node, and wherein the circuit establishment packet includes the 4-tuple and the circuit ID, where in response to the third node receiving the circuit establishment packet from the first node, the third node updates its stored information with the 4-tuple and the associated circuit ID, and updates a corresponding third triple stored at the third node to identify the new first circuit link as being a portion of the circuit.

9. The system of claim 8, wherein the circuit establishment packet is a first circuit establishment packet, where in response to establishing the new first circuit link from the first node to the third node, the third node accesses the third leg table to identify a third circuit link between the third node and the second node, wherein the third node associates the circuit ID with the third circuit link to identify the third circuit link in its third circuit table as a portion of the circuit between the source node and the destination node, wherein the third node sends a second circuit establishment packet that includes the 4-tuple and the circuit ID to the second node, where in response to the second node receiving the second circuit establishment packet from the first node, the second node updates its stored information with the 4-tuple and the associated circuit ID, and updates a corresponding second triple stored at the second node to identify the third circuit link as being a portion of the circuit.

10. A method that enables network communications over a circuit that is identified by a circuit identifier (ID), comprising:

receiving at a first node a communications packet communicated from a source node to a destination node, wherein the communications packet includes the circuit ID;

accessing circuit information from a first circuit table stored at the first node, wherein the circuit information is accessed based on the circuit ID received in the communications packet, and wherein the circuit information includes the circuit ID and an associated 4-tuple that has an identifier of the source node, an identifier of the destination node, an identifier of a source service, and an identifier of a destination service;

determining that the first node should send the communications packet to a second node;

accessing first leg information from a leg table stored at the first node, wherein the leg table is accessed based on the circuit ID received in the communications packet, wherein the first leg information includes the circuit ID and an associated first triple that includes at least a first link ID, a first local leg ID, and a first direction that defines a travel direction of communications packets for a first leg;

identifying a first circuit link based on the accessed leg information for the first leg;

communicating the communications packet to the second node over the identified first circuit link;

in response to a failure of the first circuit link, accessing second leg information from the leg table stored at the first node, wherein the second leg information includes a second triple that includes at least a second link ID, a second local leg ID, and a second direction that defines a travel direction of communications packets for a second leg;

identifying a second circuit link based on the accessed leg information for the second leg, wherein the second circuit link is between the first node and a third node;

communicating a first circuit establishment packet to the third node over the identified second circuit link, wherein the first circuit establishment packet includes the 4-tuple and the circuit ID;

where in response to the third node receiving the first circuit establishment packet from the first node, storing the 4-tuple and the circuit ID in the received first circuit establishment packet in a third circuit table stored at the third node;

storing a corresponding third triple at the third node to identify the second circuit link as being a portion of the circuit;

accessing third leg information from the leg table stored at the third node, wherein the third leg information includes the third triple that includes at least a third link ID, a third local leg ID, and a third direction that defines a travel direction of communications packets for a third leg;

identifying a third circuit link based on the accessed leg information for the third leg, wherein the third circuit link is between the third node and the second node;

communicating a second circuit establishment packet to the second node over the identified third circuit link, wherein the second circuit establishment packet includes the 4-tuple and the circuit ID; and where in response to the second node receiving the second circuit establishment packet from the third node, storing a corresponding fourth triple at the second node to identify the third circuit link as being a portion of the circuit;

wherein the circuit between the source node and the destination node comprises the second circuit link and the third circuit link.

11. The method of claim 10, wherein the communications packet is a first communications packet, and further comprising:

receiving a second communications packet after failure of the first circuit link at the first node, wherein the second communications packet includes the circuit ID;

communicating the second communications packet from the first node to the third node over the second circuit link; and communicating the second communications packet from the third node to the second node over the third circuit link.

12. The method of claim 11, further comprising:

in response to receiving the second communications packet at the first node, accessing circuit information from the first circuit table stored at the first node, wherein the circuit information is accessed based on the circuit ID received in the second communications packet, and wherein the circuit information includes the circuit ID and the associated 4-tuple that has the identifier of the source node, the identifier of the destination node, the identifier of the source service, and the identifier of the destination service;

determining that the first node should send the second communications packet to the third node;

accessing the second leg information from the leg table stored at the first node, wherein the second leg information includes the second triple that includes at least the second link ID, the second local leg ID, and the second direction that defines the travel direction of communications packets for the second leg; and identifying the second circuit link based on the accessed leg information for the second leg, wherein the second communications packet is communicated to the third node over the identified second circuit link.

13. The method of claim 12, further comprising:

in response to receiving the second communications packet at the second node, accessing circuit information from the third circuit table stored at the third node, wherein the circuit information is accessed based on the circuit ID received in the second communications packet, and wherein the circuit information includes the circuit ID and the associated 4-tuple that has the identifier of the source node, the identifier of the destination node, the identifier of the source service, and the identifier of the destination service;

determining that the third node should send the communications packet to the second node;

accessing the third leg information from the leg table stored at the third node, wherein the third leg information includes the third triple that includes at least the third link ID, the third local leg ID, and the third direction that defines the travel direction of communications packets for the third leg; and identifying the third circuit link based on the accessed leg information for the third leg, wherein the second communications packet is communicated to the second node over the identified third circuit link.

14. The method of claim 10, wherein the first circuit link is defined by the first link ID, the first local leg ID, and the first direction, wherein the second circuit link is defined by the second link ID, the second local leg ID, and the second direction; and wherein the third circuit link is defined by the third link ID, the third local leg ID, and the third direction.

* * * * *